US011898418B2

(12) United States Patent
Abdelaziz et al.

(10) Patent No.: US 11,898,418 B2
(45) Date of Patent: Feb. 13, 2024

(54) PREVENTION OF FERROMAGNETIC SOLIDS DEPOSITION ON ELECTRICAL SUBMERSIBLE PUMPS (ESPS) BY MAGNETIC MEANS

(71) Applicant: Saudi Arabian Oil Company, Dhahran (SA)

(72) Inventors: Mohannad Abdelaziz, Dhahran (SA); Rafael Adolfo Lastra Melo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 217 days.

(21) Appl. No.: 17/146,913

(22) Filed: Jan. 12, 2021

(65) Prior Publication Data

US 2021/0131232 A1 May 6, 2021

Related U.S. Application Data

(62) Division of application No. 16/170,677, filed on Oct. 25, 2018, now Pat. No. 11,111,925.

(51) Int. Cl.

*E21B 41/00* (2006.01)
*E21B 43/12* (2006.01)
*B03C 1/033* (2006.01)
*F04D 13/08* (2006.01)
*F04B 53/20* (2006.01)

(52) U.S. Cl.

CPC ............ *E21B 41/00* (2013.01); *B03C 1/0335* (2013.01); *E21B 43/128* (2013.01); *F04D 13/086* (2013.01); *B03C 2201/18* (2013.01); *F04B 53/20* (2013.01); *F04B 2205/501* (2013.01)

(58) Field of Classification Search

CPC ..... B03C 1/0332; B03C 1/0335; B03C 1/288; E21B 37/08; E21B 41/00; E21B 43/128; F04B 15/02; F04B 53/20; F04B 2205/501; F04D 13/086; F04D 29/406

See application file for complete search history.

(56) References Cited

U.S. PATENT DOCUMENTS 2,725,824 A 12/1955 Arutunoff
4,217,213 A * 8/1980 Schuster ................ B03C 1/033 210/695

(Continued)

FOREIGN PATENT DOCUMENTS

WO WO 2017127667 7/2017

OTHER PUBLICATIONS

GCC Examination Report in Gulf Cooperation Council Appln. No. GC 2019-38522, dated Dec. 27, 2020, 3 pages.

(Continued)

*Primary Examiner* — Devon C Kramer
*Assistant Examiner* — Joseph S. Herrmann
(74) *Attorney, Agent, or Firm* — Fish & Richardson P.C.

(57) ABSTRACT

A system is provided for use with an electrical submersible pump (ESP). The system includes an ESP mounted on a tubing and a magnetic field source positioned above the ESP. The magnetic field source generates a magnetic field configured to suspend iron-containing particles above a discharge of the ESP. The magnetic field prevents an accumulation of the iron-containing particles onto components of the ESP during a powered-off state of the ESP.

6 Claims, 3 Drawing Sheets

(56) References Cited

U.S. PATENT DOCUMENTS

| | | | | |
|---|---|---|---|---|
| 5,700,376 | A | 12/1997 | Carpenter | |
| 6,668,925 | B2 * | 12/2003 | Shaw | E21B 43/38 166/370 |
| 7,174,957 | B1 * | 2/2007 | Jokhio | B03C 1/0332 166/107 |
| 7,841,826 | B1 * | 11/2010 | Phillips | F04D 29/2288 415/199.3 |
| 8,684,185 | B2 | 4/2014 | Ries | |
| 9,028,687 | B2 * | 5/2015 | Goraj | B03C 1/0332 210/223 |
| 9,441,435 | B2 * | 9/2016 | Leitch | E21B 43/128 |
| 2005/0161405 | A1 | 7/2005 | Holland | |
| 2006/0048941 | A1 | 3/2006 | Borst et al. | |
| 2008/0295861 | A1 | 12/2008 | Mai | |
| 2013/0192682 | A1 | 8/2013 | Freese | |
| 2019/0118781 | A1 * | 4/2019 | Horn | C23G 5/02 |

OTHER PUBLICATIONS

PCT International Search Report and Written Opinion in International Appln. No. PCT/US2019/057561, dated Jan. 31, 2020, 15 pages.

Allenson et al., "Application of Emulsion Viscosity Reducers to Lower Produced Fluid Viscosity," OTC 22443, presented at the Offshore Technology Conference Brazil, Oct. 4-6, 2011.

Alsabagh et al., "Demulsification of W/O emulsion at petroleum field and reservoir conditions using some demulsifiers based on polyethylene and propylene oxides," Egyptian Journal of Petroleum, 25:Dec. 4, 2016, 11 pages.

Ariffin et al., "The Rheology of Light Crude Oil and Water-In-Oil-Emulsion," Procedia Engineering 148, 4th International Conference on Process Engineering and Advanced Materials, Dec. 2016, 7 pages.

Houben, "Iron oxide incrustations in wells. Part 1: genesis, mineralogy and geochemistry," Applied Geochemistry, 2003, 18(6):927-939, 13 pages.

rmspumptools.com' [online], "ADV (Automatic Diverter Valve)," available on or before Feb. 6, 2017, retrieved on Oct. 29, 2018, retrieved from URL <http://www.rmspumptools.com/products/automatic-diverter-valve.php>, 5 pages.

slb.com' [online], "Auto Flow Sub," available on or before 2008, retrieved on Oct. 29, 2018, retrieved from URL <https://www.slb.com/~/media/Files/artificial_lift/product_sheets/al_03_080_0_lo.pdf>, 2 pages.

Zhao, "RPSEA: Final Technical Report, 08121.2201.02.FINAL, Heavy Viscous Oil Pressure, Volume and Temperature, 08121-2201-02," RPSEA (Research Partnership to Secure Energy for America, Feb. 4, 2015, 250 pages.

Communication Pursuant to Article 94 (3) EPC issued in European Appln. No. 19802416.8 dated Dec. 22, 2021, 7 pages.

* cited by examiner

PREVENTION OF FERROMAGNETIC SOLIDS DEPOSITION ON ELECTRICAL SUBMERSIBLE PUMPS (ESPS) BY MAGNETIC MEANS

CROSS-REFERENCE TO RELATED APPLICATIONS

This application is a divisional of and claims the benefit of U.S. application Ser. No. 16/170,677, filed on Oct. 25, 2018, the entire contents of which are incorporated by reference in its entirety.

BACKGROUND

The present disclosure applies to electrical submersible pumps (ESP). Solid accumulation or deposition inside and on top of the ESP can cause ESP failures. The accumulation can occur, for example, when the pump is in a shut-down state, during which time suspended solids in the wellbore can settle and fall onto the ESP's inner parts. The presence of solids on the ESP's inner parts can reduce the efficiency of the pumping system and can cause various types of failures or failure modes.

For example, solid particles that are deposited in the contact area between rotating bodies (such as inside the bearings, ceramic disks, or tungsten carbide disks) can introduce friction. The friction can cause increases in temperature, pump wear, and efficiency reduction. Moreover, cracks can be introduced into components of the pumping system, which can eventually lead to breakage of the pump shaft. In a second example, non-uniform deposition of particles on the rotating stages can occur, and an imbalance of the rotating stages can cause a high vibration in the downhole system. In a third example, solid particles that coat or attach to the inner surfaces of the impeller and diffuser can cause wear of the pump and can reduce the pump's efficiency. All of these examples can create a situation in which higher current values are withdrawn by the pump. Further, large accumulations of deposits can block inlets to the pump. Attempts to restart the pump under such conditions can introduce current spikes, which can lead to electrical cable failures.

Solid particles that can cause problems with ESPs can come from various sources. For example, some solids can include small-to-fine particles that are produced with the flow from the formation (for example, sand). In another example, the solids can include scale particles that are formed at several locations in the wellbore or the near-wellbore region. At various times, such as when the ESP is in operation, the majority of the particles can be carried out of the wellbore by the flow. However, when the velocity of flow drops below a certain level (for example, twice the settling velocity of these particles), the particles can deposit. This type of condition can occur, for example, when the ESP is shut off. At that time, the solids suspended by the wellbore fluid (for example, a volume of fluid inside of 5,000 feet of tubing) can begin to settle and travel downward inside the borehole due to the forces of gravity, and the solids can deposit inside the ESP. A common occurrence in the industry is to discover that, for many failed ESPs, solids have settled and concentrated at the top of the pump.

Many conventional techniques that attempt to solve the problem of solids settling and affecting ESPs can include the use of an annular diverter valve on top of the ESP. Once the ESP is shut off, the valve can divert the fluid above the ESP to an annular space (for example, between the ESP and the casing) in an attempt to prevent solids from accumulating on top of the ESP. Major drawbacks of these conventional techniques can include the following. The diverter valve can introduce tubing to an annular communication point, which is typically a potential weak point which it is recommended to avoid in any completion string. Resulting damage to the flapper or sliding sleeve can leave the diverter valve in an open position. The damage can introduce unwanted annular communication causing fluid circulation in the pump, which can render the system unusable.

SUMMARY

The present disclosure describes techniques that can be used for preventing solids from settling on electrical submersible pumps (ESPs). In some implementations, a system is provided for use with an ESP. The system includes an ESP mounted on a tubing and a magnetic field source positioned above the ESP. The magnetic field source generates a magnetic field configured to suspend iron-containing particles above a discharge of the ESP. The magnetic field prevents an accumulation of the iron-containing particles onto components of the ESP during a powered-off state of the ESP.

The subject matter described in this specification can be implemented in particular implementations, so as to realize one or more of the following advantages. First, ferromagnetic particles can be suspended above the discharge of the ESP without requiring any moving parts and or introducing annular communication. Second, the techniques do not introduce weak points in the well completion system because there is no need for annular communication between tubing and casing.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
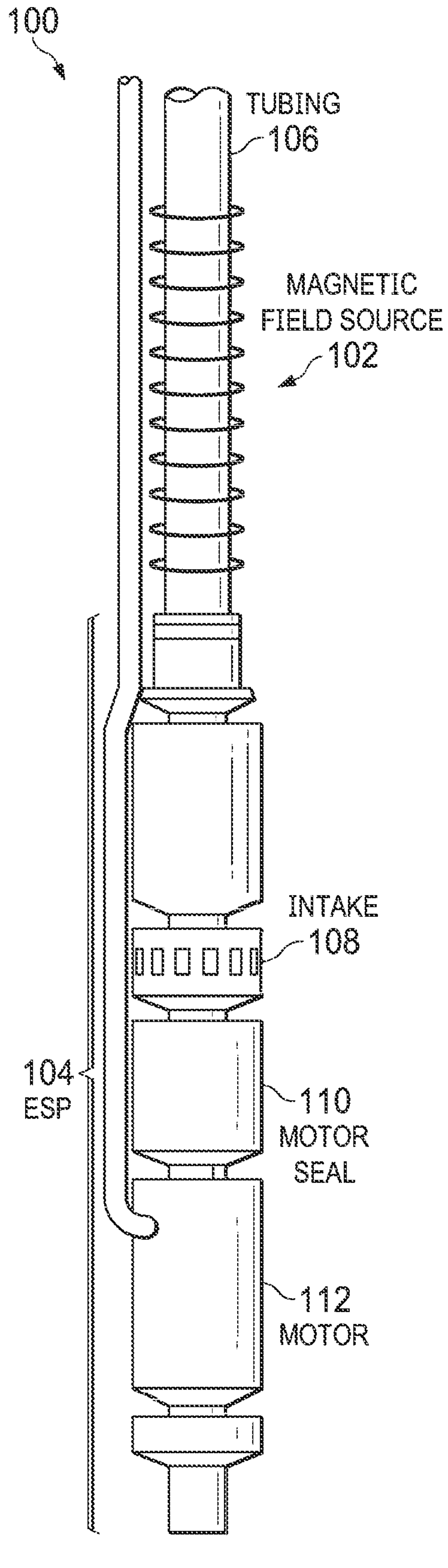
FIG. 1 is a diagram of an example of a configuration for applying a magnetic field source above an electrical submersible pump (ESP) for capturing ferrous particles, according to some implementations of the present disclosure.

The following detailed description describes techniques for using magnetic fields to suspend solid particles above an electrical submersible pumps (ESP) in a wellbore. For example, the techniques can be used to magnetically suspend or attract ferromagnetic solid particles at a location above the discharge of the ESP. Doing this can prevent or otherwise reduce particles from settling down on top of the ESP, such as when the pump is turned off. Subsequently, when the ESP is turned on and production resumes, these particles can be carried away downstream by the flow of hydrocarbons. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques for using magnetic fields to suspend solid particles above the ESP can take advantage of the fact that, in most major oil fields, the solid particles are ferromagnetic. For example, the solid particles can contain iron (Fe), which can be in the form of iron sulfide, iron oxide, and iron carbonate. Some of the particles can come from the formation (for example, including solids flowing with the hydrocarbon flow) or can be formed by scale deposition mechanisms in the wellbore or near-wellbore region.

The techniques include the installation of a magnetic source that magnetically suspends the ferromagnetic particles above the discharge of the ESP, preventing the particles from falling down on top of the ESP when the pump is turned off. When production resumes, the particles can be carried away downstream by the flow of hydrocarbons. The techniques described in the present disclosure can overcome drawbacks of the conventional annular diverter, particularly by not including any moving parts and by not introducing annular communication.

The techniques described in the present disclosure can be used in the prevention of solid from falling on top of the ESP by magnetically capturing these solids at a specific location above the ESP by suspension or attraction during the non-operating time of the ESP until the next flow cycle at which these solids will be flushed away with production. In this way, the objective is different when compared to conventional systems; rather than preventing the tubing from having accumulation of solids, solids are prevented from falling into the ESP or the number of solids falling into the ESP is reduced. The application of the magnetic field is different from the application in conventional systems. Rather than applying magnetic forces axially or internally onwards to prevent lodging of solids to the inner tubing surface, magnetic forces can be applied axially or externally outward to suspend fluids and prevent or reduce a number of them from falling.

FIG. 1 is a diagram of an example of a configuration 100 for applying a magnetic field source 102 above an ESP 104 for capturing ferrous particles. The magnetic field generated by the magnetic field source 102 can be, for example, longitudinal to tubing 106 used in the wellbore. In another example, the magnetic source can provide a magnetic force that acts radially outward from the tubing 106. The magnetic field source 102 is located above an intake 108 of the ESP 104, which is located above a motor seal 110 and a motor 112.

Figure 2:
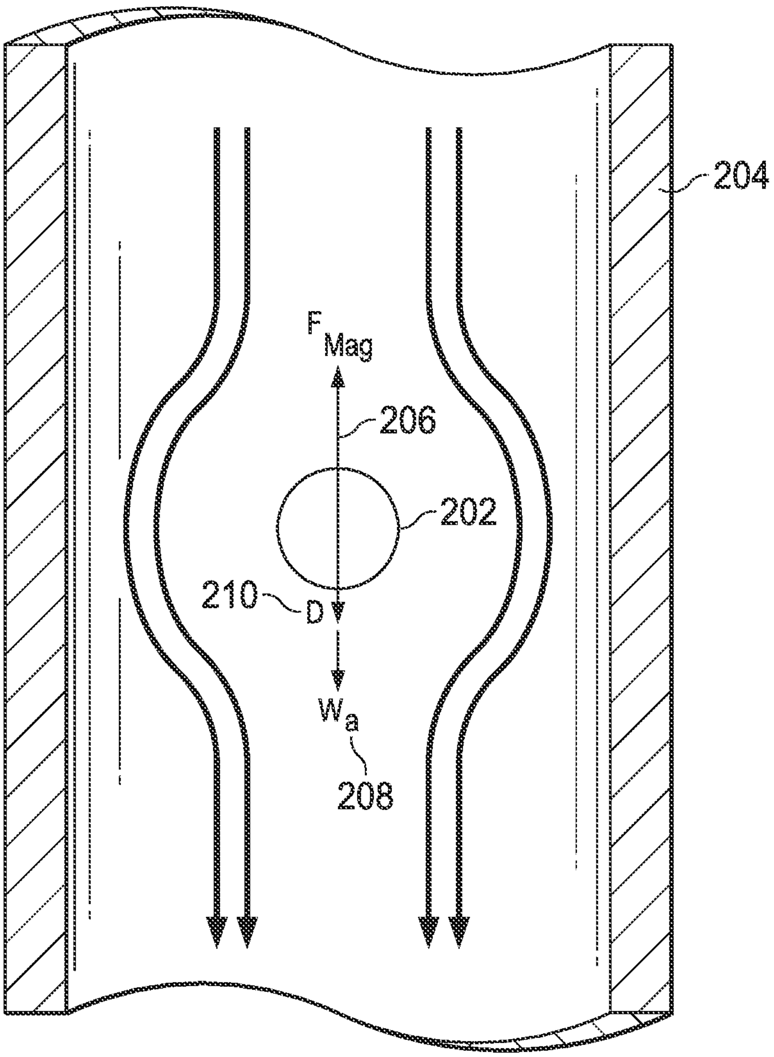
FIG. 2 is a drawing of example forces acting on a ferromagnetic particle in a wellbore, according to some implementations of the present disclosure.

FIG. 2 is a drawing of example forces acting on a ferromagnetic particles 202 in a wellbore 204. The forces include a magnetic force 206, a weight force 208, and a drag force 210. The magnetic field source 102 can generate enough magnetic force to counteract a weight force 208 and a drag force 210 of ferromagnetic particles 202 that are in the wellbore 204.

In some implementations, the source for the magnetic field can be provided by permanent magnets. For example, the permanent magnets can be installed as part of an installed (or retrofitted onto existing) through-tubing installation. The permanent magnets can be arranged, for example, in a configuration that generates an upward-acting resultant magnetic force.

In some implementations, an electromagnetic field can be generated using an electric coil. The use of the electric coil can provide an advantage of controlling times at which the magnetic field is applies. For example, the electric coil can be energized when the ESP is deactivated (or turned off) or just before turning the ESP off. Times at which the ESP is energized can be controlled automatically, such as through an on-off switch of the ESP, or can be controlled manually. Using an electric coil can provide advantages, including allowing ferromagnetic particles 202 to be released and flushed from the wellbore. This can be better than allowing larger amounts of ferromagnetic particles 202 to accumulate on permanent magnets over time, which can affect the strength and effectiveness of the permanent magnets, which may allow some particles to settle on the ESP. In some implementations, configurations that include combinations of permanent magnets and electric coils can be used, such as to provide a permanent backup in situations in which the electric coils cannot be powered.

In some implementations, the coil can be powered using the same power cable of the ESP. A controller for switching between the coil or ESP (or for powering both) can be downhole or at the surface. In implementations that use a downhole control, new circuits can be introduced at the ESP's bottom hole assembly (BHA). The circuits can be used to control, for example, the selection of whether to energize the pump or the coil based on the amplitude (or frequency) of the voltage supplied. In implementations that use an electric coil for generating the electromagnetic field, a new splice can be introduced to a power cable that provides power to the ESP. The new splice can be introduced in different locations. For example, splicing can happen inside the pothead, and a cable extension to the coil can be used above the pump. This can require a new pothead design. In another example, the new splice can be introduced above the pothead at the location of the coil.

In some implementations, the coil can be powered using a separate electrical line that is provided from the surface. Switch controllers can also exist at the surface for controlling when power is to be provided to the coil.

Figure 3:
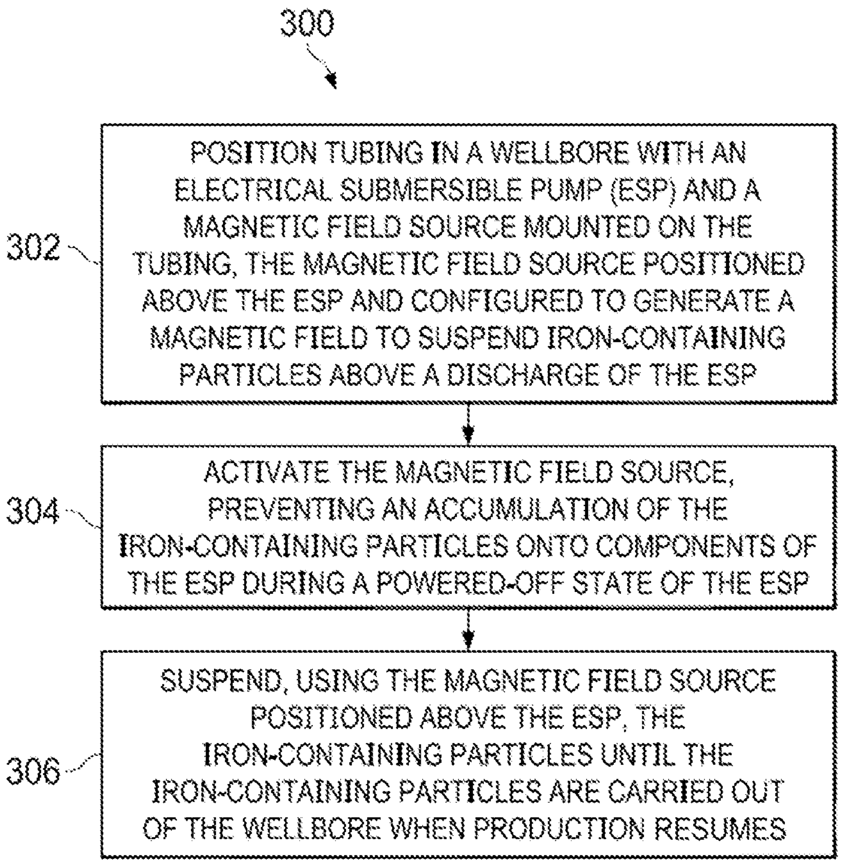
FIG. 3 is a flowchart of an example method for activating a magnetic field source positioned above an ESP, according to some implementations of the present disclosure.

FIG. 3 is a flowchart of an example method 300 for activating a magnetic field source positioned above an electrical submersible pump (ESP), according to some implementations of the present disclosure. For clarity of presentation, the description that follows generally describes method 300 in the context of the other figures in this description. However, it will be understood that method 300 may be performed, for example, by any suitable mechanical systems, environment, software, and hardware, or a combination of suitable mechanical systems, environments, software, and hardware, as appropriate. In some implementations, various steps of method 300 can be run in parallel, in combination, in loops, or in any order.

At 302, tubing is positioned in a wellbore with an ESP and a magnetic field source mounted on the tubing. The magnetic field source is positioned above the ESP and is configured to generate a magnetic field to suspend iron-containing particles above a discharge of the ESP. For example, the tubing 106, on which are mounted the magnetic field source 102 and the ESP 104, is placed in a wellbore. The magnetic field source 102 can generate a magnetic field in the area of the magnetic field source 102 to suspend iron-containing particles above the intake 108. From 302, method 300 proceeds to 304.

At 304, the magnetic field source is activated, preventing an accumulation of the iron-containing particles onto components of the ESP during a powered-off state of the ESP. For example, if permanent magnets are used for the magnetic field source 102, then there is a continuous state of preventing the accumulation of the iron-containing particles onto components of the ESP. If an electric coil is used for the magnetic field source 102, then power to the electric coil can be timed so that the electric coil is only used during a powered-off state of the ESP. From 304, method 300 proceeds to 306.

At 306, the iron-containing particles remain in suspension using the magnetic field source positioned above the ESP until they are carried out of the wellbore when production resumes. As an example, regardless of the implementation of the magnetic field source 102 (for example, magnets or an electric coil), the magnetic field source 102 can prevent particles from reaching the intake 108. From 306, method 300 stops.

Figure 4:
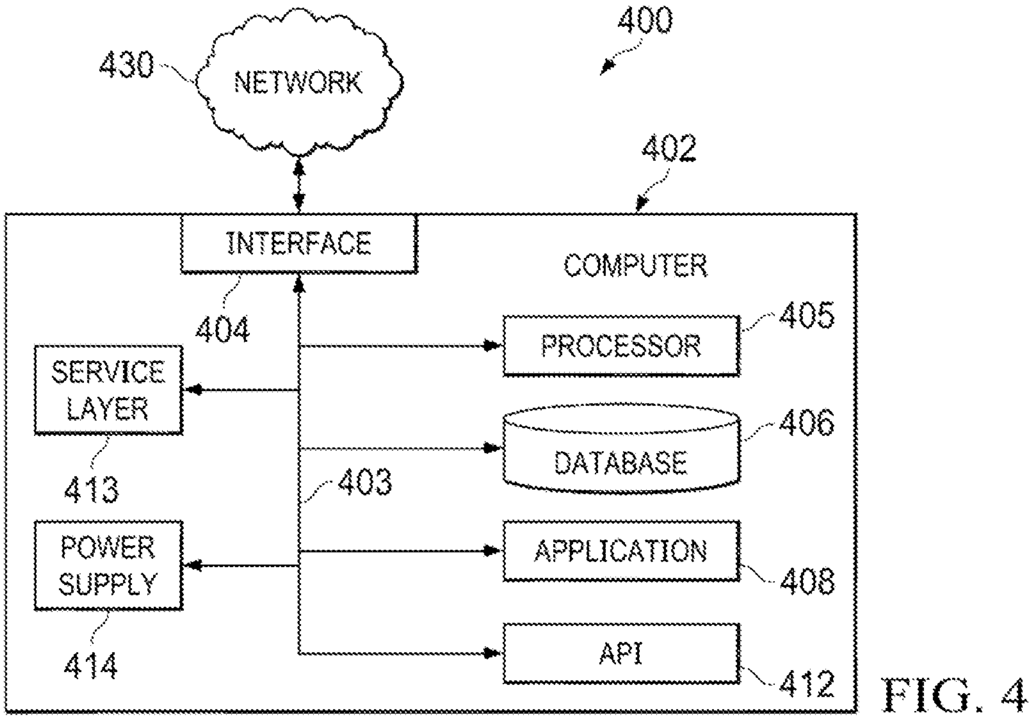
FIG. 4 is a block diagram illustrating an example computer system used to provide computational functionalities associated with described algorithms, methods, functions, processes, flows, and procedures as described in the instant disclosure, according to some implementations of the present disclosure.

FIG. 4 is a block diagram of an example computer system 400 used to provide computational functionalities associated with described algorithms, methods, functions, processes, flows, and procedures, as described in the instant disclosure, according to some implementations of the present disclosure. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical-type user interface (UI) (or GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, email server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402 or other components (or a combination of both) that can be connected to the network 430 (whether illustrated or not). Memory 407 can store any data consistent with this disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a system comprising: an electrical submersible pump (ESP) mounted on a tubing; and a magnetic field source positioned above the ESP, the magnetic field source generating a magnetic field configured to suspend iron-containing particles above a discharge of the ESP, preventing an accumulation of the iron-containing particles onto components of the ESP during a powered-off state of the ESP.

The foregoing and other described implementations can each, optionally, include one or more of the following features:

A first feature, combinable with any of the following features, wherein the magnetic field is longitudinal to the tubing.

A second feature, combinable with any of the previous or following features, wherein the magnetic field comprises a magnetic force acting radially outward from the tubing.

A third feature, combinable with any of the previous or following features, wherein the magnetic field source comprises permanent magnets.

A fourth feature, combinable with any of the previous or following features, wherein the magnetic field source comprises an electric coil generating an electromagnetic field.

A fifth feature, combinable with any of the previous or following features, wherein the electric coil is powered using a same power supply as the ESP.

A sixth feature, combinable with any of the previous or following features, wherein the electric coil is powered using a separate power supply.

A seventh feature, combinable with any of the previous or following features, wherein the electric coil is energized when the ESP is off or just before turning the ESP off In a second implementation, a method comprising: positioning tubing in a wellbore with an ESP and a magnetic field source mounted on the tubing, the magnetic field source positioned above the ESP and configured to generate a magnetic field to suspend iron-containing particles above a discharge of the ESP; activating the magnetic field source, preventing an accumulation of the iron-containing particles onto components of the ESP during a powered-off state of the ESP; and suspending, using the magnetic field source positioned above the ESP, the iron-containing particles until the iron-containing particles are carried out of the wellbore when production resumes.

The foregoing and other described implementations can each, optionally, include one or more of the following features:

A first feature, wherein the magnetic field is longitudinal to the tubing.

A second feature, wherein the magnetic field comprises a magnetic force acting radially outward from the tubing.

A third feature, wherein the magnetic field source comprises permanent magnets.

A fourth feature, wherein the magnetic field source comprises an electric coil generating an electromagnetic field.

A fifth feature, further comprising powering the electric coil using a same power supply as the ESP.

A sixth feature, further comprising powering the electric coil using a separate power supply.

A seventh feature, wherein powering the electric coil occurs when the ESP is off or just before turning the ESP off.

In a third implementation, a non-transitory, computer-readable medium storing one or more instructions executable by a computer system to perform operations comprising: positioning tubing in a wellbore with an ESP and a magnetic field source mounted on the tubing, the magnetic field source positioned above the ESP and configured to generate a magnetic field to suspend iron-containing particles above a discharge of the ESP; activating the magnetic field source, preventing an accumulation of the iron-containing particles onto components of the ESP during a powered-off state of the ESP; and suspending, using the magnetic field source positioned above the ESP, the iron-containing particles until the iron-containing particles are carried out of the wellbore when production resumes.

The foregoing and other described implementations can each, optionally, include one or more of the following features:

A first feature, wherein the magnetic field is longitudinal to the tubing.

A second feature, wherein the magnetic field comprises a magnetic force acting radially outward from the tubing.

A third feature, wherein the magnetic field source comprises permanent magnets.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light-emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in this invention can be any file system type accessible from multiple servers for read and update. Locking or consistency tracking is not necessary in this invention since the locking of exchange file system can be done at application layer. Furthermore, Unicode data files are different from non-Unicode data files.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method;

a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A non-transitory, computer-readable medium storing one or more instructions executable by a computer system to perform operations comprising:

in a tubing positioned in a wellbore with an electrical submersible pump (ESP) and a magnetic field source mounted on the tubing, the magnetic field source positioned above the electrical submersible pump (ESP) and configured to generate a magnetic field to suspend iron-containing particles above a discharge of the electrical submersible pump (ESP):

activating the magnetic field, preventing an accumulation of the iron-containing particles onto components of the electrical submersible pump (ESP) during a powered-off state of the electrical submersible pump (ESP);

suspending, using the magnetic field source positioned above the electrical submersible pump (ESP), the iron-containing particles until the electrical submersible pump (ESP) resumes production to flow the iron-containing particles out of the wellbore; and switching, by a controller, between powering the electrical submersible pump (ESP) and powering the magnetic field source, including powering a selected one of the electrical submersible pump (ESP) and the magnetic field source.

2. The non-transitory, computer-readable medium of claim 1, wherein the magnetic field is longitudinal to the tubing.

3. The non-transitory, computer-readable medium of claim 1, wherein the magnetic field comprises a magnetic force acting radially outward from the tubing.

4. The non-transitory, computer-readable medium of claim 1, wherein the magnetic field source comprises an electric coil generating an electromagnetic field as the magnetic field.

5. The non-transitory, computer-readable medium of claim 4, wherein the powering of the electric coil uses a same power supply as the electrical submersible pump (ESP).

6. The non-transitory, computer-readable medium of claim 4, wherein the powering of the electric coil occurs when the electrical submersible pump (ESP) is off or just before turning off the electrical submersible pump (ESP).

* * * * *